US008006284B2

(12) United States Patent
Ayatsuka

(10) Patent No.: US 8,006,284 B2
(45) Date of Patent: Aug. 23, 2011

(54) ELECTRONIC DEVICE, INFORMATION PROCESSING SYSTEM, INFORMATION PROCESSING APPARATUS AND METHOD, PROGRAM, AND RECORDING MEDIUM

(75) Inventor: Yuji Ayatsuka, Tokyo (JP)

(73) Assignee: Sony Corporation (JP)

( * ) Notice: Subject to any disclaimer, the term of this patent is extended or adjusted under 35 U.S.C. 154(b) by 1242 days.

(21) Appl. No.: 10/979,941

(22) Filed: Nov. 2, 2004

(65) Prior Publication Data

US 2005/0100168 A1  May 12, 2005

(30) Foreign Application Priority Data

Nov. 7, 2003  (JP) .............................. P2003-377794

(51) Int. Cl.
*G06F 7/04* (2006.01)

(52) U.S. Cl. ............ 726/3; 709/203; 709/225; 709/229; 709/232; 709/245; 713/1; 713/150; 713/182; 711/100; 711/163

(58) Field of Classification Search .................. 380/277, 380/278; 705/41, 50; 709/232, 203, 245, 709/225, 229; 713/1, 150, 182; 370/390, 370/395.3, 396; 711/100, 163
See application file for complete search history.

(56) References Cited

U.S. PATENT DOCUMENTS

| 4,330,825 | A | * | 5/1982 | Girard | 710/104 |
| 5,901,311 | A | * | 5/1999 | Labatte et al. | 713/2 |
| 5,940,507 | A | * | 8/1999 | Cane et al. | 713/165 |
| 6,034,832 | A | * | 3/2000 | Ichimura et al. | 360/60 |
| 6,137,710 | A | * | 10/2000 | Iwasaki et al. | 365/52 |
| 6,163,803 | A | * | 12/2000 | Watanabe | 709/217 |
| 6,169,803 | B1 | * | 1/2001 | Sako et al. | 380/44 |
| 6,345,116 | B1 | * | 2/2002 | Kojima et al. | 382/167 |
| 6,373,952 | B2 | * | 4/2002 | Asano et al. | 380/278 |
| 6,438,550 | B1 | * | 8/2002 | Doyle et al. | 707/9 |
| 6,532,513 | B1 | * | 3/2003 | Yamamoto et al. | 711/100 |
| 6,560,221 | B1 | * | 5/2003 | Hara et al. | 370/352 |

(Continued)

FOREIGN PATENT DOCUMENTS

JP  2000207835 A  7/2000

(Continued)

OTHER PUBLICATIONS

Office Action from Japanese Application No. 2003-377794, dated Apr. 1, 2010.

(Continued)

*Primary Examiner* — Nasser Moazzami
*Assistant Examiner* — Shanto M Abedin
(74) *Attorney, Agent, or Firm* — Lerner, David, Littenberg, Krumholz & Mentlik, LLP

(57) ABSTRACT

A user is enabled to easily access a data area on a network, and to use the data area with security, wherein a recording medium records an address for accessing a prescribed area of a storage apparatus installed in an other apparatus and keys to be used for encrypting data. When the recording medium is installed in the apparatus, the address is read-out from the recording medium and, based on the read-out address, accessing to the prescribed area is started. When the user actually accesses the recording medium, the prescribed area is accessed. In the apparatus to which the recording medium is installed, processing such as a path conversion is carried out as required so that the user is able to operate without mentioning such procedure.

8 Claims, 10 Drawing Sheets

U.S. PATENT DOCUMENTS

| | | | |
|---|---|---|---|
| 6,587,911 B1* | 7/2003 | Kawamura et al. | 710/315 |
| 6,668,211 B1* | 12/2003 | Fujita et al. | 700/245 |
| 6,750,902 B1* | 6/2004 | Steinberg et al. | 348/211.3 |
| 6,760,541 B1* | 7/2004 | Ohba | 386/125 |
| 6,789,166 B2* | 9/2004 | Kamise et al. | 711/115 |
| 6,941,059 B1* | 9/2005 | Horiguchi | 386/46 |
| 7,020,636 B2* | 3/2006 | Ohmori et al. | 705/51 |
| 7,035,363 B1* | 4/2006 | Ikeda | 375/356 |
| 7,050,190 B2* | 5/2006 | Yamazaki et al. | 358/1.15 |
| 7,062,543 B2* | 6/2006 | Kishimoto | 709/219 |
| 7,117,331 B2* | 10/2006 | Uchiumi et al. | 711/164 |
| 7,231,658 B2* | 6/2007 | Kunito et al. | 726/2 |
| 7,233,787 B2* | 6/2007 | Higuchi et al. | 455/414.1 |
| 7,266,691 B1* | 9/2007 | Ishiguro et al. | 713/168 |
| 7,272,859 B2* | 9/2007 | Kuriya et al. | 726/29 |
| 7,296,055 B2* | 11/2007 | Nomura et al. | 709/204 |
| 7,299,271 B2* | 11/2007 | Sato | 709/219 |
| 7,418,425 B2* | 8/2008 | Yamada et al. | 705/39 |
| 7,574,720 B1* | 8/2009 | Yamazaki et al. | 725/50 |
| 2002/0002503 A1* | 1/2002 | Matsuoka | 705/26 |
| 2002/0016823 A1* | 2/2002 | Ueno et al. | 709/206 |
| 2002/0030757 A1* | 3/2002 | Onuki | 348/373 |
| 2002/0040399 A1* | 4/2002 | Nagashima | 709/227 |
| 2002/0083326 A1* | 6/2002 | Shimada | 713/182 |
| 2002/0095382 A1* | 7/2002 | Taoka et al. | 705/50 |
| 2002/0103765 A1* | 8/2002 | Ohmori | 705/67 |
| 2002/0106086 A1* | 8/2002 | Kamiya et al. | 380/277 |
| 2002/0184154 A1* | 12/2002 | Hori et al. | 705/50 |
| 2003/0050050 A1* | 3/2003 | Higuchi et al. | 455/414 |
| 2003/0110214 A1* | 6/2003 | Sato | 709/203 |
| 2003/0117978 A1* | 6/2003 | Haddad | 370/331 |
| 2003/0156589 A1* | 8/2003 | Suetsugu | 370/396 |
| 2004/0030891 A1* | 2/2004 | Kurihara | 713/168 |
| 2005/0289235 A1* | 12/2005 | Suematsu et al. | 709/230 |
| 2006/0242262 A1* | 10/2006 | Riegler et al. | 709/217 |

FOREIGN PATENT DOCUMENTS

| | | |
|---|---|---|
| JP | 2001265939 A | 9/2001 |
| JP | 2001306526 A | 11/2001 |
| JP | 2001357019 A | 12/2001 |
| JP | 2002092083 A | 3/2002 |
| JP | 2002367281 A | 12/2002 |
| JP | 2003051837 A | 2/2003 |
| WO | 2003025930 A1 | 3/2003 |
| WO | 2003067590 A1 | 8/2003 |

OTHER PUBLICATIONS

Office Action from Japanese Application No. 2003-377794, dated Jul. 15, 2010.

* cited by examiner

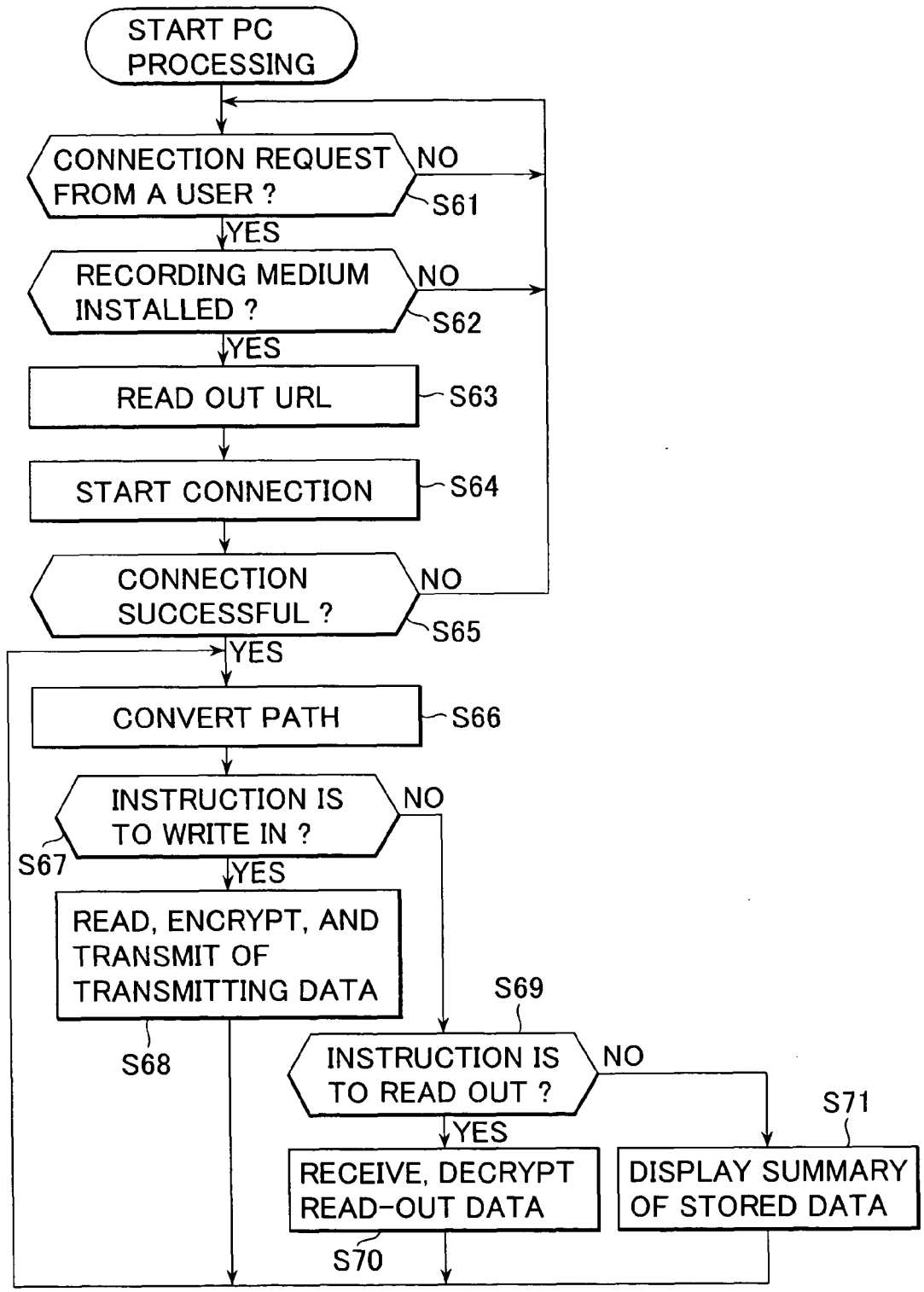

FIG.13

```
PROPFIND /file.jpgHTTP/1.1
Content-Type:text/xml
Content-Length:380
Depth:1
```

```
PROPFIND /transpace/dir012345/file1.jpgHTTP/1.1
Content-Type:text/xml
Content-Length:380
Depth:1
```

FIG.14

```
<?xml versin = "1.0" encoding = "utf-8"?>
<D:multi status xmlns:"DAV:">
<D:response xmlns:i0 = "DAV:"xmlns:lp0 =>
"DAV:"xmlns:lp1 = "http://apache.org/dav/props/">
<D:href>/transpace/dir012345/file1.jpg<D:href>
<D:propstat>
<D:prop>
<D:getcontenttype>image/jpeg</D:getcontenttype>
```

```
<?xml versin = "1.0" encoding = "utf-8"?>
<D:multi status xmlns:"DAV:">
<D:response xmlns:i0 = "DAV:"xmlns:lp0 =>
  "DAV:"xmlns:lp1 = "http://apache.org/dav/props/">
<D:href>/file1.jpg<D:href>
<D:propstat>
<D:prop>
<D:getcontenttype>image/jpeg</D:getcontenttype>
```

ELECTRONIC DEVICE, INFORMATION PROCESSING SYSTEM, INFORMATION PROCESSING APPARATUS AND METHOD, PROGRAM, AND RECORDING MEDIUM

CROSS REFERENCE TO RELATED APPLICATION

This application claims priority from Japanese Priority Document No. 2003-377794, filed on Nov. 7, 2003 with the Japanese Patent Office, which document is hereby incorporated by reference.

BACKGROUND OF THE INVENTION

1. Field of the Invention

The present invention relates to an electronic device, an information processing system, an information processing apparatus and a method, a program, and recording medium, and particularly relates to a superior electronic device, an information processing system, an information processing apparatus and a method, a program, and recording medium capable of being connected to a network in a manner that is not troublesome for a user, and being adopted when carrying out processing or transferring data.

2. Description of Related Art

In recent years, as communication technology has developed, environments where various items of device such as PDAs (Personal Digital Assistants) and televisions, etc. are connected together via a network to enable data to be transferred have been put into place. For example, it is now possible for an image reproduced using a personal computer to be transmitted via a home network and be displayed on a television.

However, when the actual connection of individual device to the network is carried out, the set-up process is straightforward, but in order to implement communication over a connection with specific device, it is necessary at this time, for example, to set up the address, etc. of the device with which it is intended to communicate, and accordingly, this is troublesome for the user. For example, in the event where images reproduced by a personal computer are transmitted via a home network and displayed using a television, it is necessary to operate a personal computer in order to set up various information such as the address of the television, etc.

Further, when the number of devices connected to the network is increased, there are problems in that it becomes difficult to distinguish which cable is used to connect which of the devices. A conventional technology as one method for resolving these problems is disclosed in patent document 1.

Patent Document 1: Japanese Laid-open Patent No. 2003-143147.

SUMMARY OF THE INVENTION

In the technology disclosed in the above mentioned Patent Document 1, there is the possibility that data may not be transferred in a safe manner. For example, while the data is being transferred, there is the possibility of misappropriation and illegal utilization of the data by illegal access.

Other examples of transferring data between devices connected to a network are now given. For example, implementations have been constructed where a connection is made to a prescribed web page when a specific music CD (Compact Disk) is installed in a personal computer, so that the user can then look at information on this web page (data can be received). In this implementation, the web page data is simply provided from one side (service providing side) to the other side (user side).

Namely, the user side is able to receive just only the data for a predetermined region. It has not been carried out that a new storage area is created on the side of the other apparatus according to a user-side request and the user can easily access this storage area. When considering the transfer of data in a secure manner, there is a further problem in that the processing relating to the accessing the storage area and transferring the data becomes complex, this, in turn, makes its implementation difficult.

In order to resolve the aforementioned situation, the present invention is advantageous in creating a situation where the connections can be made with other apparatuses in a straightforward manner, and data can be transferred while maintaining the security after the connections are completed.

The electronic device of the present invention is an electronic device for correlating information processing terminals connected together via a network, comprising storage means for storing connection information for connecting to other terminals and keys used when encrypting data, first providing means for providing the connection information stored in the storage means to an information processing terminal in the event of installation in a prescribed information processing terminal, and second providing means for providing the keys stored in the storage means to the information processing terminal in the event of transferring the data via the network.

An information processing system of the present invention is an information processing system configured from first to third information processing apparatuses connected to a prescribed network, wherein the first information processing apparatus comprises storage means for storing data, securing means for securing a storage area of a prescribed capacity in the storage means according to a request from the second information processing apparatus, and providing means for providing connection information for connecting to the storage area secured by the securing means to the second information processing apparatus, the second information processing apparatus comprises requesting means for making a request to the first information processing terminal to secure a storage area, receiving means for receiving the connection information supplied by the providing means, generating means for generating the keys used in encryption, and recording means for recording the connection information received by the receiving means and keys generated by the generating means in the prescribed recording medium, and the third information processing apparatus comprises connection means for reading the connection information from the recording medium in the event that the recording medium recorded with the connection information and the keys by the recording means is installed, and connecting to the storage area, and encryption means for reading the keys from the recording medium in the event that the data is transmitted at a time after completion of the connection with the storage area by the connection means, and encrypting the transmitted data.

The first information processing apparatus of the present invention is an information processing apparatus for managing data supplied from another information processing apparatus, comprising storage means for storing data, securing means for securing a storage area of a prescribed capacity in the storage means according to a request from another information processing apparatus, providing means for providing connection information for connecting to the storage area secured by the securing means to another information processing apparatus, and control means for reading out the data stored in the storage area according to a request of another information processing apparatus, and controlling writing of the data to the storage area.

It is possible for the data stored in the storage area to be data encrypted using the keys managed on the side of another information processing apparatus.

A first information processing method of the present invention is an information processing method for an information processing device for managing data supplied from another information processing apparatus, comprising a securing step for securing a storage area of a prescribed capacity in a storage device according to a request from another information processing apparatus, a providing step for providing connection information for connecting to the storage area secured as a result of processing in the securing step to another information processing apparatus, and a control step for reading out the data stored in the storage area according to a request of another information processing apparatus, and controlling writing of the data to the storage area.

A first program of the present invention is a computer program for controlling an information processing device for managing data supplied from an information processing apparatus, comprising a securing step for securing a storage area of a prescribed capacity in a storage device according to a request from another information processing apparatus, a providing step for providing connection information for connecting to the storage area secured as a result of processing in the securing step to another information processing apparatus, and a control step for reading out the data stored in the storage area according to a request of another information processing apparatus, and controlling writing of the data to the storage area.

A program of a first recording medium of the present invention is a computer program, recorded so as to be readable by a computer, for controlling an information processing apparatus for managing data supplied from another information processing apparatus, comprising a securing step for securing a storage area of a prescribed capacity in a storage device according to a request from another information processing apparatus, a providing step for providing connection information for connecting to the storage area secured as a result of processing in the securing step to another information processing apparatus, and a control step for reading out the data stored in the storage area according to a request of another information processing apparatus, and controlling writing of the data to the storage area.

The second information processing apparatus of the present invention comprises read-out means for reading out connection information stored in an electronic device in the event that the electronic device correlating information processing terminals to be connected is installed, connection means for connecting with another information processing terminal based on the connection information read-out by the read-out means, encryption means for reading out the keys from other electronic device and encrypting the data in the event that the data is sent to other information processing apparatus, decrypting means for reading out the keys from the electronic device and decrypting the data in the event that the data is received from another information processing apparatus.

It is also possible to further provide conversion means for converting a path indicating the transmission destination from the path for the electronic device to the path for another information processing apparatus in the event that the data encrypted by the encryption means is transmitted, and converting a path indicating a location where the data is stored from a path for electronic device to a path for another information processing apparatus in the event that a request is made for the data decrypted by the decrypting means to another information processing apparatus.

The second information processing method of the present invention is an information processing method for an information processing device equipped with at least read-out means for reading out information from installed electronic device and communication means for transferring data to and from other information processing apparatuses, comprising a read-out step of reading out the connection information stored in the electronic device in the event that the electronic device correlating information processing terminals to be connected is installed, a connection control step of controlling connection with another information processing terminal based on the connection information read out as a result of processing of the read-out step, an encryption step of reading out the keys from other electronic device and encrypting the data in the event that the data is sent to another information processing apparatus, and a decrypting step of reading out the keys from the electronic device and decrypting the data in the event that the data is received from another information processing apparatus.

A second program of the present invention is a computer program for controlling an information processing apparatus equipped with at least read-out means for reading out information from an installed electronic device and communication means for transferring data to and from other information processing apparatuses, comprising a read-out step of reading out the connection information stored in the electronic device in the event that the electronic device correlating information processing terminals to be connected is installed, a connection control step of controlling connection with another information processing terminal based on the connection information read out as a result of processing of the read-out step, an encryption step of reading out the keys from other electronic device and encrypting the data in the event that the data is sent to other information processing apparatuses, and a decrypting step of reading out the keys from the electronic device, and decrypting the data in the event that the data is received from another information processing apparatus.

A program of the second recording medium of the present invention is a computer program for controlling an information processing device equipped with at least read-out means for reading out information from an installed electronic device and communication means for transferring data to and from other information processing apparatuses, comprising a read-out step of reading out the connection information stored in the electronic device in the event that the electronic device correlating the information processing terminals to be connected is installed, a connection control step of controlling connection with another information processing terminal based on the connection information read out as a result of processing of the read-out step, an encryption step for reading out the keys from other electronic device and encrypting the data in the event that the data is sent to other information processing apparatuses, and a decrypting step for reading out the keys from electronic device and decrypting the data in the event that the data is received from another information processing apparatuses.

The connection information for connecting to the information processing terminals and the keys for encrypting data are stored at the electronic device of the present invention, and are supplied to the installed information processing apparatuses as required.

In the information processing system of the present invention, the first information processing apparatus allots the prescribed storage areas of the storage devices managed by itself to the second information processing apparatus in response to requests from the second information processing apparatus. The third information processing apparatus in which the electronic device recorded with the connection information for connecting to the allotted storage area such as, for example, a URL then connects to the storage area managed by the first information processing apparatus based on this URL and reads out and writes in the data. This data is encrypted using a key stored in the electronic device.

In the first information processing apparatus, method and program of the present invention, the prescribed storage areas of the storage devices managed by the first information processing apparatus itself are allotted to other information processing apparatuses in response to requests from other information processing apparatuses and the connection information for connecting to these storage areas is provided.

With the second information processing apparatus, method, and program of the present invention, in the event that the electronic device recorded with the connection information for connecting to the storage area allotted by other information processing apparatus such as, for example, a URL, is installed, the storage area managed by another information processing apparatus is connected to based on this URL and reading out and writing in of data is performed. This data can be encrypted using the key stored in the electronic device.

According to the present invention, a connection is made with another apparatus, and data provided by this other apparatus can be received.

According to the present invention, there are no (or very few) processes in the processing for connecting with other apparatus that requires the intervention of the user and accessing of other apparatuses can therefore be achieved in a straightforward manner on the user side. Further, if the data is misappropriated as a result of transferring the data after a connection is made, it is possible for this data to be of a format that it is not possible to use. This makes it possible to improve security.

BRIEF DESCRIPTION OF THE DRAWINGS

FIG. 12 is a flowchart illustrating a PC processing;

FIG. 13 is a view illustrating a path conversion;

FIG. 14 is a further view illustrating the path conversion; and

DETAILED DESCRIPTION OF THE PREFERRED EMBODIMENTS

Figure 1:
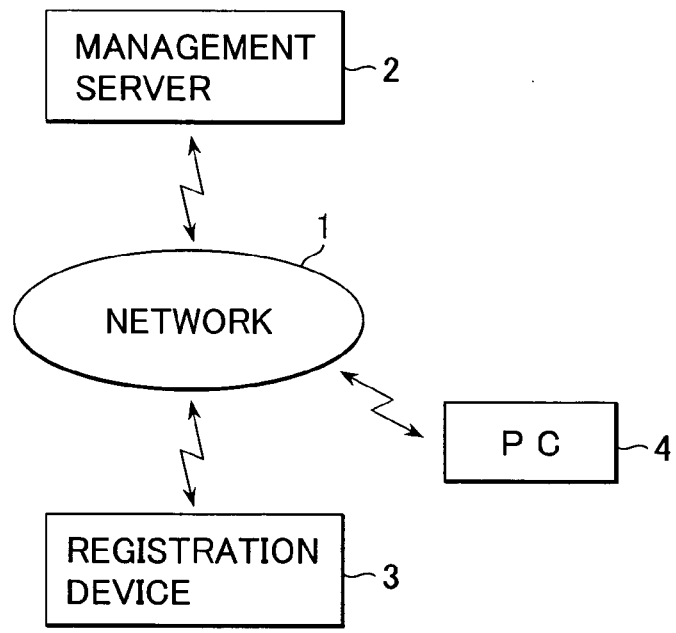
FIG. 1 is a view showing a configuration of a first embodiment of a system to which the present invention is applied.

The following is a description of the preferred embodiments of the present invention exemplifying the corresponding relationship of the disclosed invention and the embodiments. The content as disclosed in this specification corresponds to this invention. This by no means infers, however, that any embodiments not disclosed herein do not correspond to this invention. Conversely, embodiments disclosed here are taken to correspond to the invention but this does not mean that such embodiments do not correspond to inventions other than this invention.

Further, this disclosure as disclosed in the specification is, by no means, meant to represent the invention in its entirety. In other words, this disclosure is the invention as disclosed in the specification, and as such does not negate aspects of the invention not claimed in this application such as the future emergence of divisional applications, amendments, or additions to the invention.

According to the present invention, an electronic device is provided. This electronic device may be, for example, a magnetic disc 101 of FIG. 4, etc. The electronic device of the present invention is comprised of storage means (for example, a recording medium 201 shown in FIG. 10) for storing connection information (for example, URLs) for connecting to other apparatuses and keys used when encrypting data, first providing means (for example, step S63 of FIG. 12) for providing the connection information stored in the storage means to an information processing terminal in the event of installation in a prescribed information processing terminal, and second providing means (for example, step S68 of FIG. 12) for providing the key stored in the storage means to the information processing terminal in the event of transferring the data via the network.

According to the present invention, an information processing system is provided. This information processing system is an information processing system configured from first to third information processing apparatuses connected to a prescribed network (for example, network 1 of FIG. 1), the first information processing apparatus (for example, a management server 2 of FIG. 1) comprises storage means (for example, a storage section 55 of FIG. 3) for storing data, securing means (for example, a storage area creation section 53 of FIG. 3) for securing a storage area of a prescribed capacity in the storage means according to a request from the second information processing apparatus, and providing means (for example, a storage control section 54 and a communication control section 51 of FIG. 3) for providing connection information for connecting to the storage area secured by the securing means to the second information processing apparatus, the second information processing apparatus (for example, the registration device 3 of FIG. 1) comprising requesting means (for example, the control section 122 of FIG. 5 for executing the processing of step S25 of FIG. 8) for making a request to the first information processing apparatus to secure a storage area, receiving means (for example, communication control section 121 of FIG. 5) for receiving connection information supplied by the providing means, generating means (for example, the key generating section 123 of FIG. 5) for generating keys used in encryption, and recording means (for example, the registration section 124 of FIG. 5) for recording the connection information received by the receiving means and the keys generated by the generating means in the prescribed recording medium, and the third information processing apparatus (for example, a PC 4 of FIG. 1) comprises connection means (for example, connection control section 185 of FIG. 7) for reading the connection information from the recording medium in the event that the recording medium recorded with the connection information and keys by the recording means is installed, and connecting to the storage area, and encryption means (for example, an encryption section 182 of FIG. 7) for reading the keys from the recording medium in the event that the data is transmitted at a time after completion of connection with the storage area by the connection means, and encrypting the transmitted data.

According to the present invention, a first information processing apparatus is provided. The first information processing apparatus is, for example, the management server 2 of FIG. 1. The first information processing apparatus is comprised of storage means (for example, the storage section 55 of FIG. 3) for storing data, securing means (for example, the storage area creation section 53 of FIG. 3) for securing a storage area of a prescribed capacity in the storage means according to a request from another information processing apparatus, providing means (for example, the storage control section 54 and a communication control section 51 of FIG. 3) for providing the connection information for connecting to the storage area secured by the securing means to another information processing apparatus, and control means (for example, storage control section 54 of FIG. 3) for reading out the data stored in the storage area according to a request of another information processing apparatus, and controlling writing of the data to the storage area.

Figure 15:
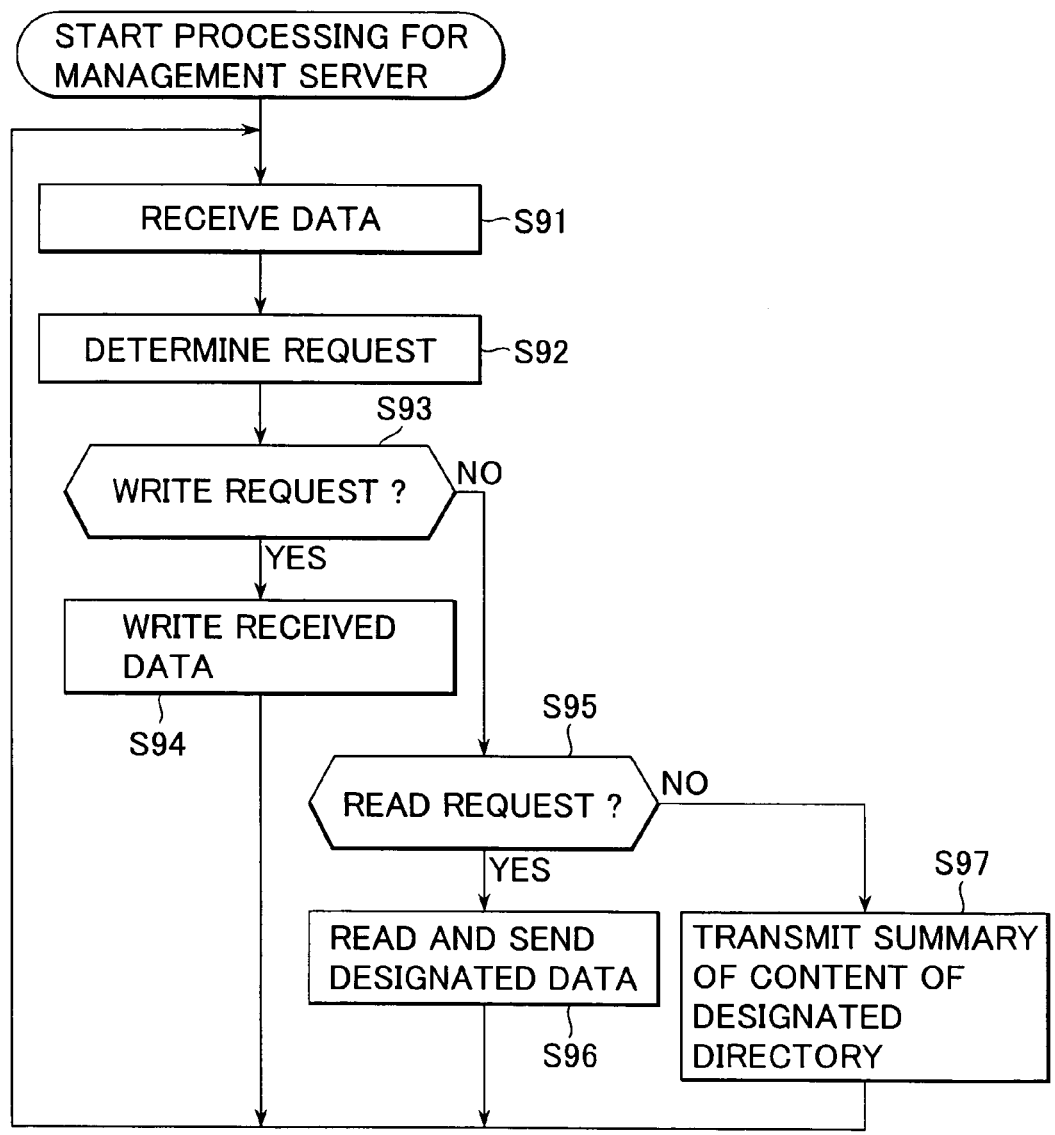
FIG. 15 is a flowchart illustrating a management server processing.

According to the present invention, a first information processing method is provided. The first information processing method is comprised of a securing step (for example, step S42 of FIG. 9) for securing a storage area of a prescribed capacity in a storage device according to a request from another information processing apparatus, a providing step (for example, step S45 of FIG. 9) for providing the connection information for connecting to the storage area secured as a result of processing in the securing step to another information processing apparatus, and a control step (for example, step S94 to step S97 of FIG. 15) for reading out the data stored in the storage area according to a request of another information processing apparatus, and controlling writing of the data to the storage area.

According to the present invention, a first program is provided. The first program is comprised of a securing step (for example, step S42 of FIG. 9) for securing a storage area of a prescribed capacity in a storage device according to a request from another information processing apparatus, a providing step (for example, step S45 of FIG. 9) for providing connection information for connecting to the storage area secured as a result of processing in the securing step to another information processing apparatus, and a control step (for example, step S94 to step S97 of FIG. 15) for reading out data stored in the storage area according to a request of another information processing apparatus, and controlling writing of the data to the storage area.

The first program is recorded on a first recording medium.

According to the present invention, a second information processing apparatus is provided. The second information processing apparatus comprises read-out means (for example, a read-out section 186 of FIG. 7) for reading out the connection information stored in the electronic device in the event that the electronic device correlating the information processing terminals to be connected is installed, connection means (for example, a connection control section 185 of FIG. 7) for connecting with another information processing terminal based on the connection information read-out by the read-out means, connection means for connecting to another information processing terminal, encryption means (for example, an encryption section 182 of FIG. 7) for reading out the keys from other electronic device and encrypting the data in the event that the data is sent to other information processing apparatuses, decrypting means (for example, a decryption section 183 of FIG. 7) for reading out the keys from the electronic device and decrypting the data in the event that the data is received from another information processing apparatus.

Conversion means (for example, the connection control section 185 of FIG. 7 for executing the processing of step S66 of FIG. 12) for converting a path indicating the transmission destination from the path for the electronic device to the path for the other information processing apparatus in the event that the data encrypted by the encryption means is transmitted, and converting a path indicating a location where the data is stored from a path for the electronic device to a path for another information processing apparatus in the event that a request is made for the data decrypted by the decrypting means to another information processing apparatus.

According to the present invention, a second information processing method is provided. The second information processing method is comprised of a read-out step (for example, step S63 of FIG. 12) of reading out connection information stored in an electronic device in the event that the electronic device correlating information processing terminals to be connected is installed, a connection control step (for example, step S64 of FIG. 12) of controlling connection with another information processing terminal based on the connection information read out as a result of processing of the read-out step, an encryption step (for example, step S68 of FIG. 12) of reading out the keys from other electronic device and encrypting the data in the event that the data is sent to other information processing apparatuses, and a decrypting step (for example, step S70 of FIG. 12) of reading out the keys from the electronic device and decrypting the data in the event that the data is received from another information processing apparatus.

According to the present invention, a second program is provided. The second program is comprised of a read-out step (for example, step S63 of FIG. 12) of reading out connection information stored in an electronic device in the event that the electronic device correlating information processing terminals to be connected is installed, a connection control step (for example, step S64 of FIG. 12) of controlling connection with another information processing terminal based on the connection information read out as a result of processing of the read-out step, an encryption step (for example, step S68 of FIG. 12) of reading out the keys from other electronic device and encrypting the data in the event that the data is sent to other information processing apparatuses, and a decrypting step (for example, step S70 of FIG. 12) of reading out the keys from the electronic device and decrypting the data in the event that the data is received from another information processing apparatus.

The second program is recorded on a second recording medium.

In the following, a description is given with reference to the drawings showing preferred embodiments of the present invention.

An outline of the embodiments is described in the following. First, a description is given to how a recording medium which stores information for connecting one apparatus (for example, a management server 2 of FIG. 1) and another apparatus (for example, a PC 4 of FIG. 1) in a straightforward manner is made. A description is then given to a connection using this recording medium.

Though data is transferred between the connected apparatuses, this data is stored in a storage area provided at the other apparatus (in this embodiment, this is described as being provided at the management server 2 of FIG. 1) rather than at the user-side apparatus. A description is now given to how to create a storage area provided at the other apparatus, and how to transfer the data stored at this storage area.

FIG. 1 is a view showing a structure of a first embodiment of an information processing system to which the present invention is applied, and is a view showing a configuration for a system relating to making the recording medium which stores information for making a connection between one apparatus and another apparatus in a straightforward manner, and processing used in making the recording medium.

A system for making (processing for recording information required to implement functions described in the following) the recording medium is configured from a management server 2 and registration device 3 connected to a network 1. The network 1 may be a wide-area network such as a WAN (Wide Area Network), the Internet, etc. or a narrow area network such as a LAN (Local Area Network), etc.

In the event that the network 1 is a wide area network, the management server is provided for managing information (taken here to be information A) for managing a function (Here, this is taken to be a function A, with this function A being taken to be, for example, a function for connecting two apparatuses.) described later on the providing side. The registration device 3 is then provided on the user side. The user side may be in a location where user is able to directly manage, such as a user's house, company, etc. or may be a prescribed shop, etc. for providing information supplied from the management server 2.

When the network 1 is a local area network (for example, a home network), the management server 2 may be, for example, an apparatus installed on the user side for managing the information A and making a connection with the providing server, or may be an apparatus installed on the user side capable of storing dedicated software for handling the information A and executing the processing using this software. The registration device 3 may also be provided on the user side as with the management server 2. In this case, it is possible for the management server 2 and the registration device 3 to be configured from a single apparatus. In this event, it is not necessary for the network 1 to be interposed there-between.

In either case, the management server 2 managing and providing information and the registration device 3 for recording information on a recording medium are in a connected state where information is transferred using the network 1, etc. As shown in FIG. 1, connection of the management server 2 and the registration device 3 is carried out by way of the network 1 as described below. A PC (Personal Computer) 4 to be connected to the management server 2 is also connected with the storage medium recorded with the information by the registration device 3 at the network 1.

Figure 2:
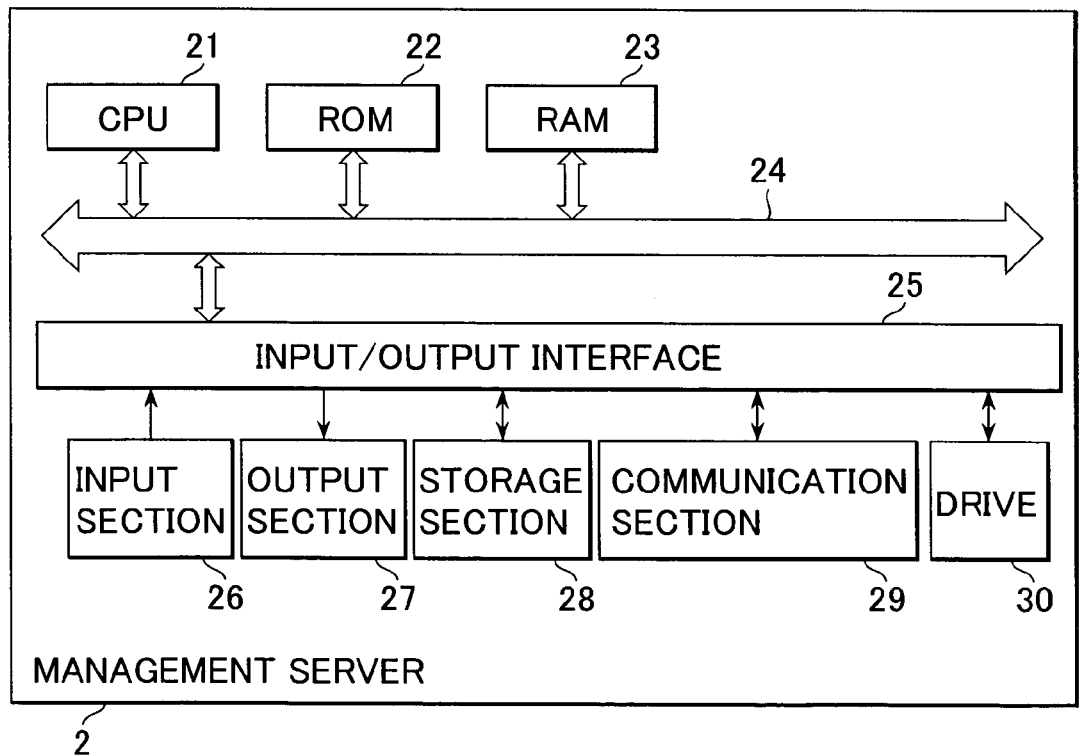
FIG. 2 is a view showing an example of an internal configuration for a management server.

FIG. 2 is a view showing an example of an internal configuration for the management server 2. The management server 2 may be configured, for example, using a personal computer. A CPU (Central Processing Unit) 21 of the management server 2 executes various processing in accordance with the programs stored in a ROM (Read Only Memory) 22. Data and programs, etc. necessary for the CPU 21 to execute various processing are appropriately stored in a RAM (Random Access Memory) 23. An input/output interface 25 has an input section 26 to which a keyboard and mouse are connected, with signals inputted to the input section 26 being outputted to the CPU 21. An output section 27 consisting of a display and speaker, etc. is also connected to the input/output interface 25.

Further, a storage section 28 constructed from a hard disc, etc. and a communication section 29 for transferring data to and from other apparatuses (for example, the registration device 3) via a network 1 such as the Internet, etc. are connected to the input/output interface 25. The drive 30 is used in the event of reading data from and writing data to the recording medium.

Figure 3:
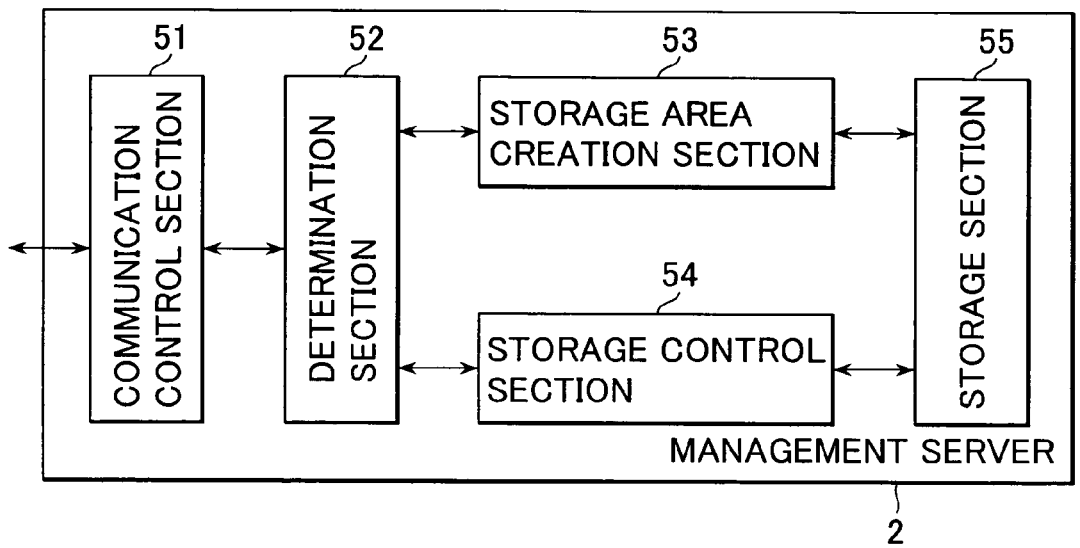
FIG. 3 is a block view showing functions of the management server.

FIG. 3 is a functional block view showing functions of the management server 2. The management server 2 has a communication control section 51 for carrying out communication with other apparatuses via the network 1. The communication control section 51 is a function implemented through the control of the communication section 29 of the management server 2 in FIG. 2. Data received by the communication control section 51 is provided to a determination section 52. Data from the determination section 52 is then provided to the communication control section 51.

The determination section 52 verifies the content of data provided by the communication control section 51 and provides the provided data to a storage area creation section 53 and a storage control section 54. The storage area creation section 53 creates a storage area to be allotted to the apparatus (user) issuing the request at a storage section 55. An address (URL: Uniform Resource Locator, or ID, etc. for uniquely identifying this region) is also created for identifying the created storage area as necessary. The storage control section 54 controls writing of the data to the storage section 55 and controls reading of the data from the storage section 55.

The determination section 52, storage area creation section 53 and storage control section 54 are functions implemented as a result of prescribed programs being executed by the CPU 21 of the management server 2 shown in FIG. 2. The storage section 55 is the storage section 28 of FIG. 2. It is also possible for each of these functions to be implemented using dedicated hardware for executing these functions.

Figure 8:
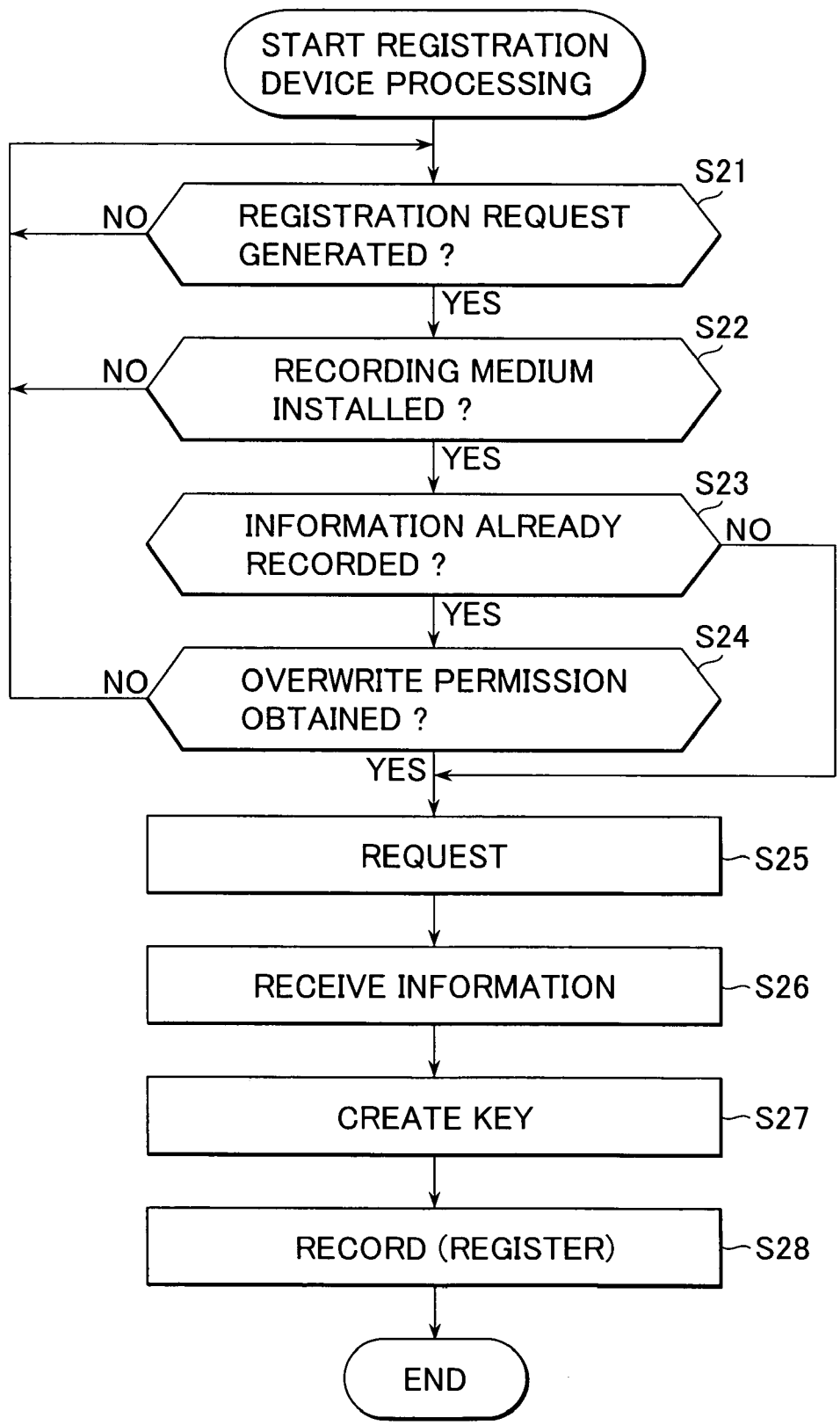
FIG. 8 is a flowchart illustrating a registration device processing.

Processing for the management server 2 having these kinds of functions is described with reference to flowcharts of FIG. 8 onwards.

Figure 4:
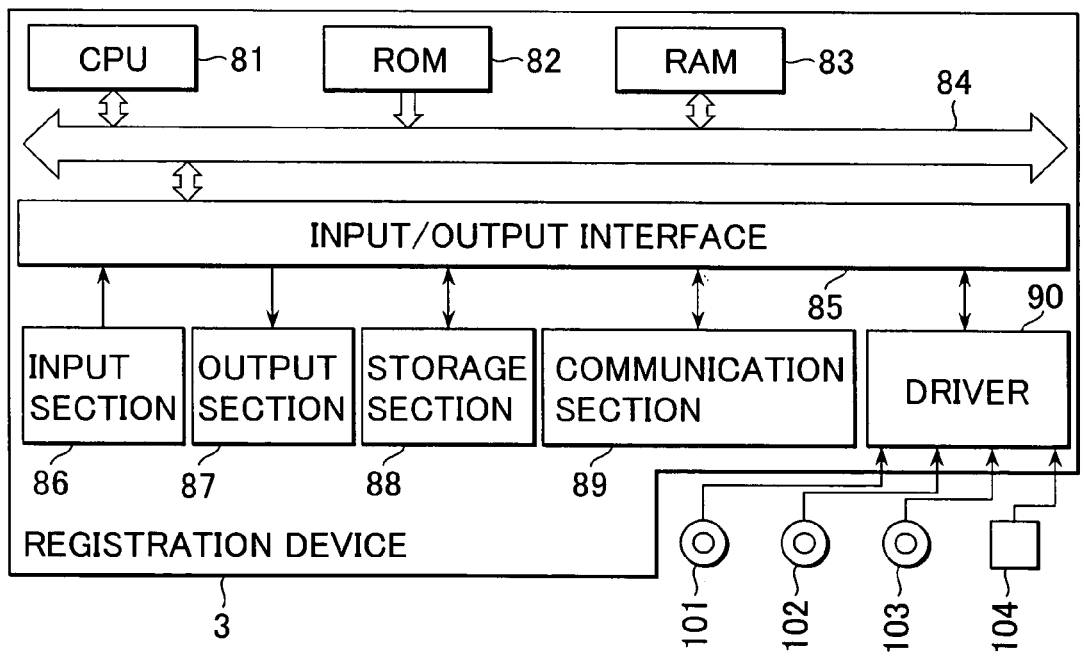
FIG. 4 is a view showing an example of an internal configuration for a registration device.

FIG. 4 is a view showing an example of an internal configuration for the registration device 3. The registration device 3 may be configured, for example, using a personal computer. A CPU 81 of the registration device 3 executes various processing in accordance with programs stored in a ROM 82. Data and programs, etc. necessary for the CPU 81 to execute various processing are appropriately stored in a RAM 83. An input/output interface 85 has an input section 86 to which a keyboard and mouse are connected, with signals inputted to the input section 86 being outputted to the CPU 81. An output section 87 consisting of a display and speaker, etc. is also connected to the input/output interface 85.

Further, a storage section 88 constructed from a hard disc, etc. and a communication section 89 for transferring data to and from other apparatuses via a network such as the Internet, etc. are connected to the input/output interface 85. The drive 90 is used in the event of reading data from or writing data to a recording medium such as a magnetic disc 101, optical disc 102, magneto-optical disc 103, semiconductor memory 104, etc.

Figure 5:
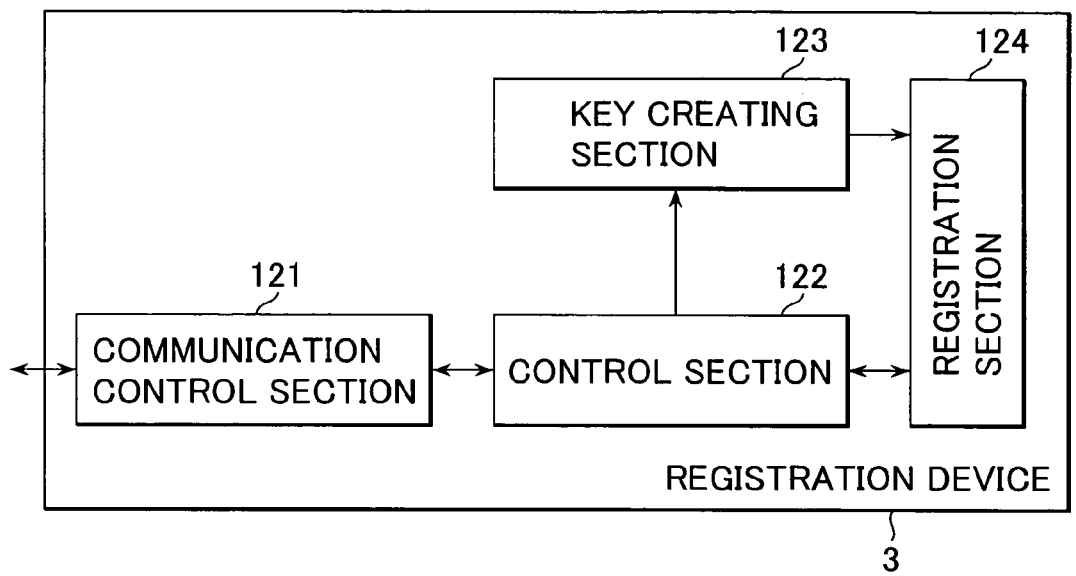
FIG. 5 is a block view showing functions of the registration device.

FIG. 5 is a functional block view showing functions of the registration device 3. The registration device 3 has a communication control section 121 for carrying out communication with other apparatuses via the network 1. The communication control section 121 is a function for controlling the communication section 89 of FIG. 4. Data received by the communication control section 121 is provided to a control section 122. Data from the control section 122 is provided to the communication control section 121.

In the event that data is supplied from the communication control section 121, the control section 122 instructs for a key to be created at a key creation section 123 as necessary. Keys created using the key creation section 123 are used in the encryption and decryption of data. Further, the control section 122 supplies data provided by the communication control section 121 to a registration section 124 as necessary. Data (as described later, this data is data relating to addresses provided by the management server 2) provided from the control section 122 and data relating to keys provided by the key creation section 123 are provided to the registration section 124. The registration section 124 then records (registers) this data on a prescribed recording medium (not shown in FIG. 5).

The control section 122 corresponds to the CPU 81 in FIG. 4. The key creation section 123 may be one function executed by the CPU 81 based on a prescribed program or may be a function configured from dedicated hardware (ICs, etc.).

The registration section 124 has a function to be implemented as a result of the drive 90 being driven under the control of the CPU 81. As shown in FIG. 4, the recording medium recorded with information by the registration section 124 may be any of the recording medium such as the magnetic disc 101, optical disc 102, magneto-optical disc 103, or the semiconductor memory 104. The recording medium may also be a recording medium that is not shown in FIG. 4.

Figure 6:
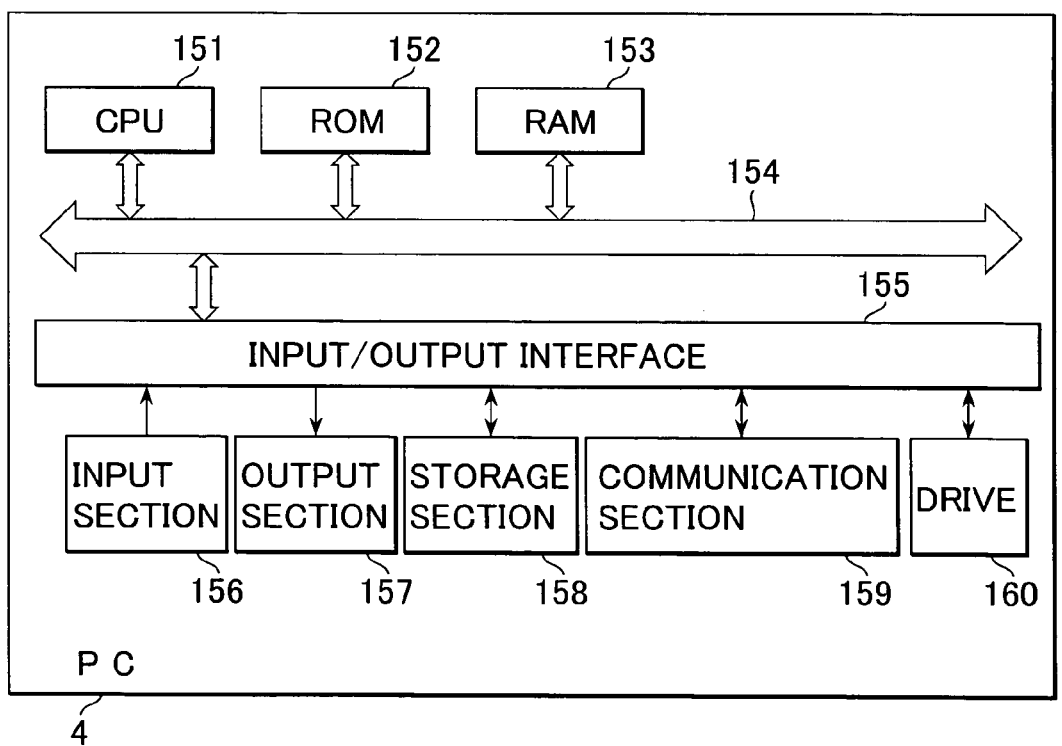
FIG. 6 is a view showing an example of an internal configuration for a PC.

FIG. 6 is a view showing an example of an internal configuration for the PC 4. A CPU 151 of the PC 4 executes various processing in accordance with programs stored in a ROM 152. Data and programs, etc. necessary for the CPU 151 to execute various processing are appropriately stored in a RAM 153. An input/output interface 155 has an input section 156 to which a keyboard and mouse are connected, with signals inputted to the input section 156 being outputted to the CPU 151. An output section 157 consisting of a display and speaker, etc. is also connected to the input/output interface 155.

Further, a storage section 158 constructed from a hard disc, etc. and a communication section 159 for transferring data to and from other apparatuses via a network such as the Internet, etc. are connected to the input/output interface 155. The drive 160 is used in the event of reading data from or writing data to a recording medium such as a magnetic disc, optical disc, magneto-optical disc, semiconductor memory, etc.

Figure 7:
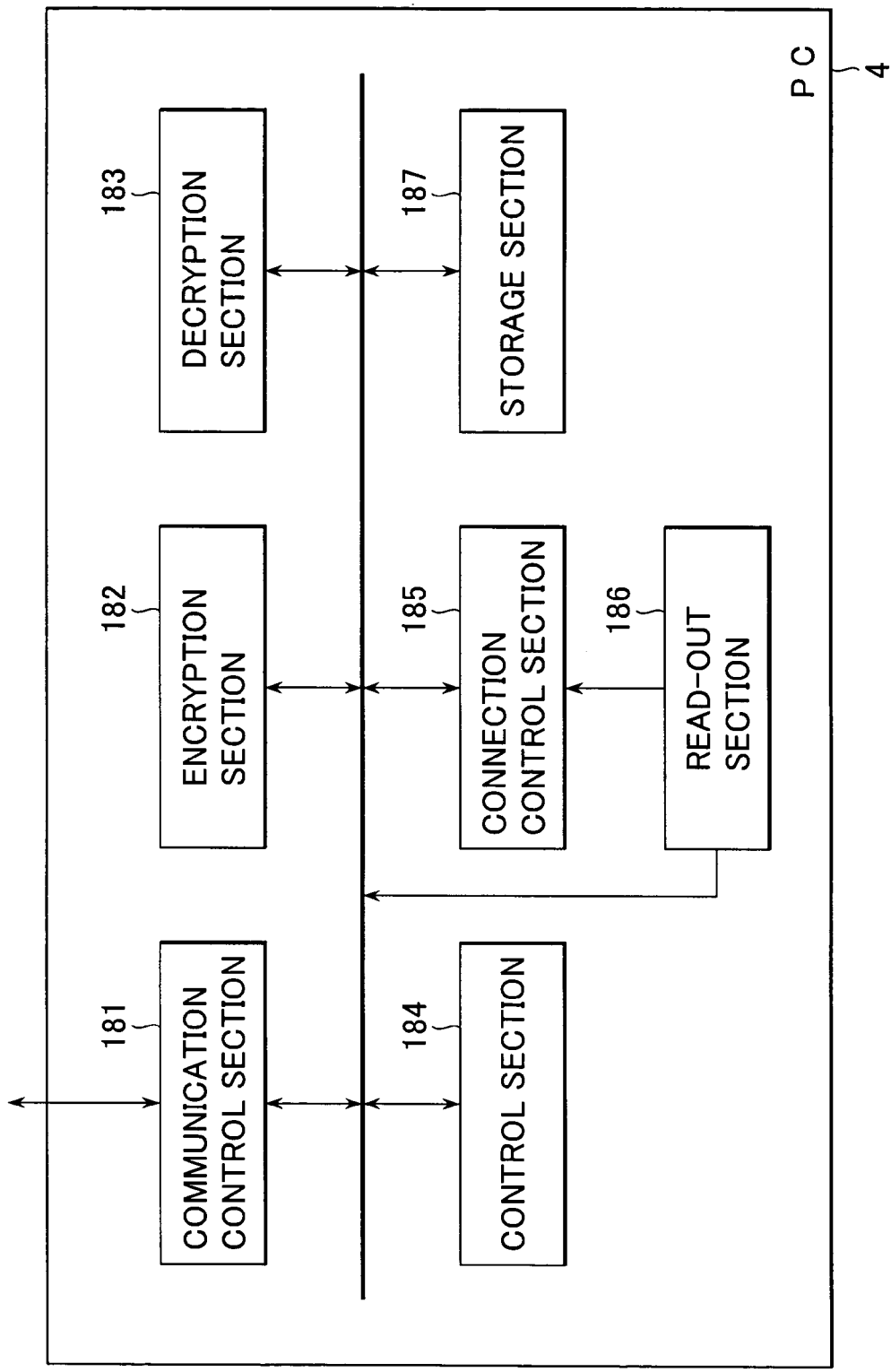
FIG. 7 is a block view showing functions of the PC.

FIG. 7 is a functional block view showing functions of PC 4. The PC 4 has a communication control section 181 for carrying out communication with other apparatuses via the network 1. The communication control section 181 is a function implemented through control of the communication section 159 of FIG. 6. The communication control section 181 sends data encrypted by an encryption section 182 via the network 1. The communication control section 181 provides received encrypted data to a decryption section 183.

While the data stored in a storage section 187, etc. is being sent to another apparatus via the network 1, the encryption section 182 encrypts the transmitted data using a key provided by a read-out section 186. The decryption section 183 then decrypts the data supplied by another apparatus using the key provided by the read-out section 186. The control section 184 controls each part of the PC 4. The connection control section 185 executes the processing to connect the PC 4 and another apparatus (in this embodiment, the management server 2 as described later) based on the information (appropriately described in the following as connection information) relating to the connections read-out from the read-out section 186.

The read-out section 186 reads out the keys and connection information from the prescribed recording medium and provides the read-out keys and connection information to other components as necessary. The storage section 187 stores the data transmitted to the other apparatus, etc.

The encryption section 182 and decryption section 183 are implemented by execution of the processing by the CPU 151 based on the prescribed programs. Further, the encryption section 182 and the decryption section 183 may also be functions implemented using dedicated hardware. The control section 184 is constituted by the CPU 151 of FIG. 6.

The read-out section 186 performs a function executed by the drive 160 under the control of the CPU 151 and also performs a function for reading out data from the recording medium installed in the drive 160. The connection control section 185 performs a function implemented as a result of the CPU 151 controlling the communication section 159. A storage section 187 performs a function constituted by the storage section and by controlling of writing of data to and reading of data from the storage section 158.

Next, a description is given of an operation of the system shown in FIG. 1. First, a description is given of processing for recording each type of various information referred to as keys and connection information in the prescribed recording medium. This processing is carried out at the management server 2 and the registration device 3. First, a description is given with reference to the flowchart of FIG. 8 of the processing on the side of the registration device 3 for starting processing relating to the management server 2 and registration at the registration device 3 in the event that a request for registration of information for a prescribed recording medium occurs.

In step S21, the registration device 3 determines whether or not there is a registration request. This determination is carried out at the control section 122 (FIG. 5). A button (not shown) operated by a user in the event, for example, of instructing a registration is provided at the input section 86 (FIG. 4) of the registration device 3. The processing of step S21 is then executed by the control section 122 determining whether or not this button is operated.

In step S21, the processing of step S21 is repeated (a waiting condition continues) until there is a determination that a registration request occurs. When it is determined that a registration request occurs, the processing proceeds to step S22. In step S22, it is determined whether or not a recording medium is installed. As described above, the purpose of the processing at the registration device 3 is to record the connection information, etc. on the prescribed recording medium. Therefore, in step S22, it is determined whether or not a recording medium for recording information is installed. As described with reference to FIG. 4, the prescribed recording medium may be a magnetic disc 101, optical disc 102, magneto-optical disc 103, semiconductor memory 104, etc.

Further, the prescribed recording medium is installed in the drive 90. The processing of step S22 is therefore carried out by the control section 122 determining whether or not a recording medium is installed in the drive 90. In step S22, in the event that it is determined that a recording medium is not installed, the processing thereafter cannot be proceeded with. Step S21 is therefore returned to and a waiting condition is entered until a new registration request is generated. In the event that it is determined that a recording medium is not installed, it is also possible for processing to be executed to display a message for ensuring that the user recognizes that a recording medium is not installed, or to generate a warning sound.

On the other hand, in step S22, in the event that it is determined that a recording medium is installed, the processing of step S23 is proceeded to. In step S23, it is determined whether or not information is already recorded on the installed recording medium. The information constituting the target of processing taken as already recorded information is the connection information and keys recorded on the recording medium in subsequent processing (processing of step S28).

As the target of processing in step S23 is the connection information and the keys, it is determined that the information is not recorded on the installed recording medium in the processing of step S23 even if other information such as, for example, image data, etc. is recorded on the recording medium. However, it is also preferable to determine other conditions such as whether or not there is enough space to record information to be recorded in step S28 together with the processing of step S23 to ensure that situations where it is not possible to record the information to be recorded in the processing in step S28 itself on the recording medium (for example, not being able to record for reasons such as the capacity being insufficient, etc.) from occurring.

The connection information is information for connecting the apparatus in which the recording medium recorded with the connection information is installed and the management server 2, but if a number of items of such information are recorded on a single recording medium, there is the possibility that a situation where processing is not carried out normally will occur. What is meant by processing not being carried out normally is that, for example, the connection information is information for accessing the prescribed storage area of the management server 2, but if there is more than one such items of information recorded, it is not possible to determine which storage area to be accessed. As a result, it may not be possible to accessed any area, or all areas may be accessed.

Naturally, if a mechanism is provided to enable a user to select one item of connection information (and therefore one storage area) in the event that there is more than one item of connection information recorded, it is also possible for a number of items of connection information to be recorded on a single recording medium. In this case, it is possible to omit the processing of step S23 and step S24. However, as will become clear from the following description, it is preferable for just one item of connection information to be recorded on one recording medium. This description therefore continues under the assumption that just one item of connection information is recorded on a single recording medium.

In the event that it is determined that necessary information is already recorded on an installed recording medium, the processing of step S24 is proceeded to. In the event that it is determined that the information is not-yet recorded on the installed recording medium, the processing of step S24 is skipped, and the processing of step S25 is proceeded to.

In step S24, a message, etc. is provided to the user to inquire whether or not to delete already recorded information and write new information, i.e. to ask whether or not to overwrite. It is then determined whether or not the results of this inquiry are that overwriting is acceptable. In step S24, in the event that it is determined that the user instructs that overwriting is acceptable, the processing advances to step S25. In the event that it is determined that the user instructs not to overwrite, step S21 is returned to, and processing thereafter is repeated.

When it is determined that the user instructs not to overwrite, processing may then be carried out to display a message instructing the user to install a new recording medium or display a message to enable recognition that processing stops.

In step S25, a request to provide the connection information is outputted at the side of the management server 2. This request is sent to the management server 2 as a result of the control section 122 first controlling the communication control section 121 so as to access the management server 2, after which, at the time where a state is entered where the data can be transferred between the communication control section 121 and the management server 2, the data indicating the request is sent from the control section 122 to the management server 2 by controlling the communication control section 121.

As a result, the control information is sent from the management server 2. In step S26, the transmitted control information (information included in which is described later) is received by the registration device 3. The control information is then received by the communication control section 121 and supplied to the control section 122. The control section 122 supplies the provided control information to the registration section 124.

While on the one hand this processing is being carried out, in step S27, the key creation section 123 creates keys. The keys being created are for encrypting data while the data is being transmitted from the user side to the management server 2. The keys created by the key creation section 123 are supplied to the registration section 124.

The key creation section 123 creates the keys using random numbers. A different key is therefore created every time a key is created so that the possibility of existing the same key is very low. It is therefore difficult to analogize a key. This makes it possible to prevent the data encrypted using this kind of key from being inappropriately utilized by a third party.

In this embodiment, the length of the key itself can be set to be any length as the keys are recorded directly onto the recording medium (without including processing such as input by the user, i.e. recorded without the intervention of the user). It is, therefore, possible for the long keys to be generated and recorded when strong encryption is required. This means that it is possible to freely set encryption strength on the user side according to the handled data.

In step S28, the registration section 124 records (registers) the connection information and keys onto the installed recording medium. The connection information for accessing the prescribed region within the storage area of the storage section 55 (FIG. 3) belonging to the management server 2, and the keys for encrypting the transferred data are recorded on the recording medium installed in the registration device 3.

At the registration device 3, while the data such as connection information and keys, etc. is being recorded in the recording medium, this data is temporarily stored in the registration device 3 (stored in a buffer unit, etc.), but it is preferable for the temporarily stored data to be deleted when recording (registration) to the recording medium is complete. This is to ensure that this data is not misappropriated by a third party at a time after the registration is complete.

Figure 9:
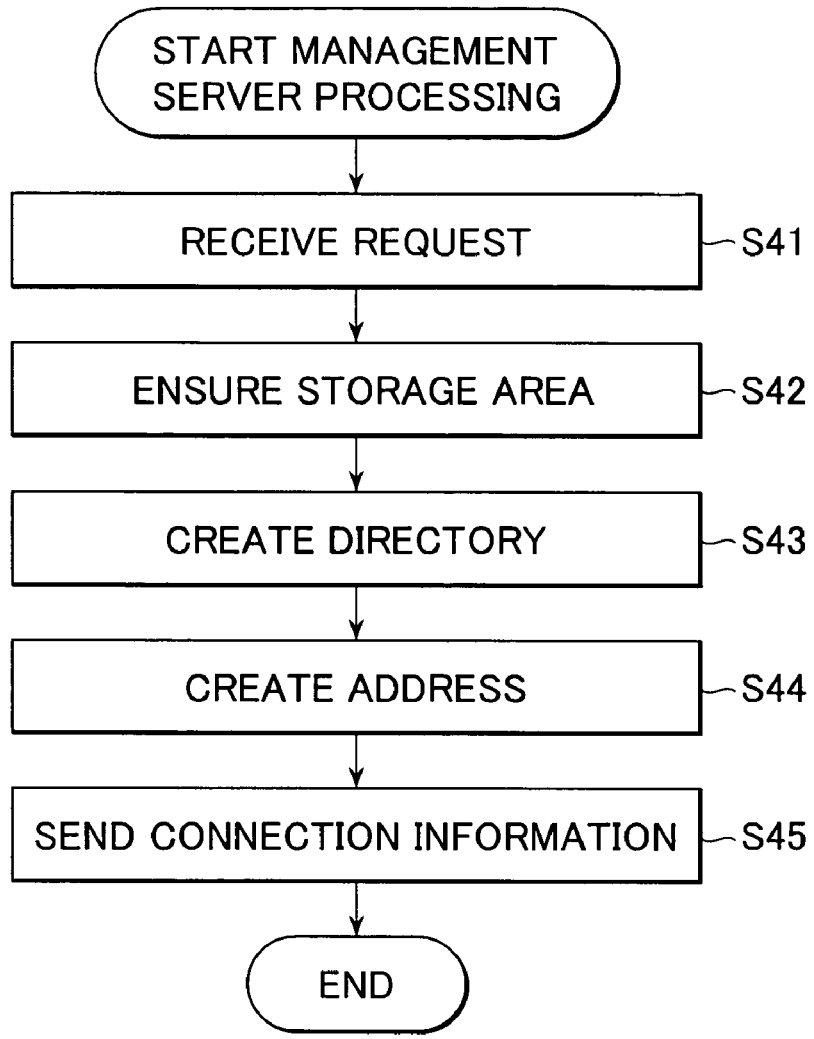
FIG. 9 is a flowchart illustrating a management server processing.

Next, a description is given with reference to the flowchart of FIG. 9 of processing occurring at the management server 2 corresponding to the processing on the side of the registration device 3. In step S41, the management server 2 receives a request sent by the registration device 3 as the processing of step S25 (FIG. 8). This receiving is carried out by the communication control section 51 (FIG. 3). The communication control section 51 provides the received data to the determination section 52. The determination section 52 analyzes the provided data and determines whether or not provision of the connection information is necessary. When the determination is carried out in this manner, the determination section 52 instructs the storage area creation section 53 to create a new storage area.

In step S42, the storage area creation section 53 creates a storage area in the storage section 55 based on this instruction. The storage area that is created then ensures that a prescribed capacity (for example, one megabyte) is allotted to the device outputting the new request (in this case, the registration device 3). In step S43, a directory is created for this secured storage area. Technology such as, for example, Web DAV (Web-based Distributed Authoring Versioning) can be used to execute this processing. Further, the other technology may also be employed. In the event of using the other technology, if the processing is carried out in accordance with this technology, it is, by no means, always necessary to create the directory, and the processing of step S43 can be omitted.

A directory is created in step S43. In step S44, an address (URL) for uniquely identifying the created directory is created. Information other than an address may also be used provided that this information temporarily identifies the storage area secured by the processing of step S42. For example, an ID, etc. may also be used to identify the storage area. Here, a description is given of making a URL for connecting to the management server 2 and connecting to a prescribed storage area.

In step S45, the created URL is sent to the registration device 3 as the connection information. The connection information transmitted as the processing of step S45 is received by the registration device 3 as the processing of step S26 (FIG. 8).

On the side of the management server 2, a storage area of the prescribed capacity is secured at the storage section 55 at the time of receiving a request from the registration device 3, a URL for accessing this secured storage area is created, and this URL is provided to the side of the registration device 3 as the connection information.

Figure 10:
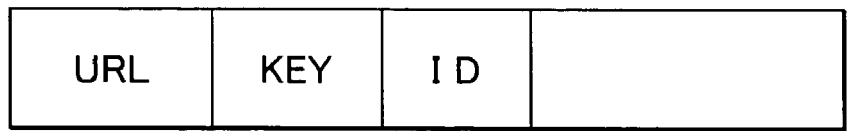
FIG. 10 is a view illustrating data recorded on a recording medium.

The information shown in FIG. 10 is then recorded on the recording medium (in the following, taken to be a recording medium 201) installed in the registration device 3 by carrying out this kind of processing using the management server 2 and the registration device 3. At least the URL for accessing the prescribed storage area of the management server 2 and a key used during transmission in order to store the data in the prescribed storage area of the management server 2 are recorded on the recording medium 201. An ID for identifying the recording medium 201 is also stored as necessary. In addition to this information, for example, passwords (the ID may also be used as a password), etc. for use in authentication processing, etc. may also be recorded while accessing a prescribed storage area of the management server 2 indicated by the URL.

Figure 11:
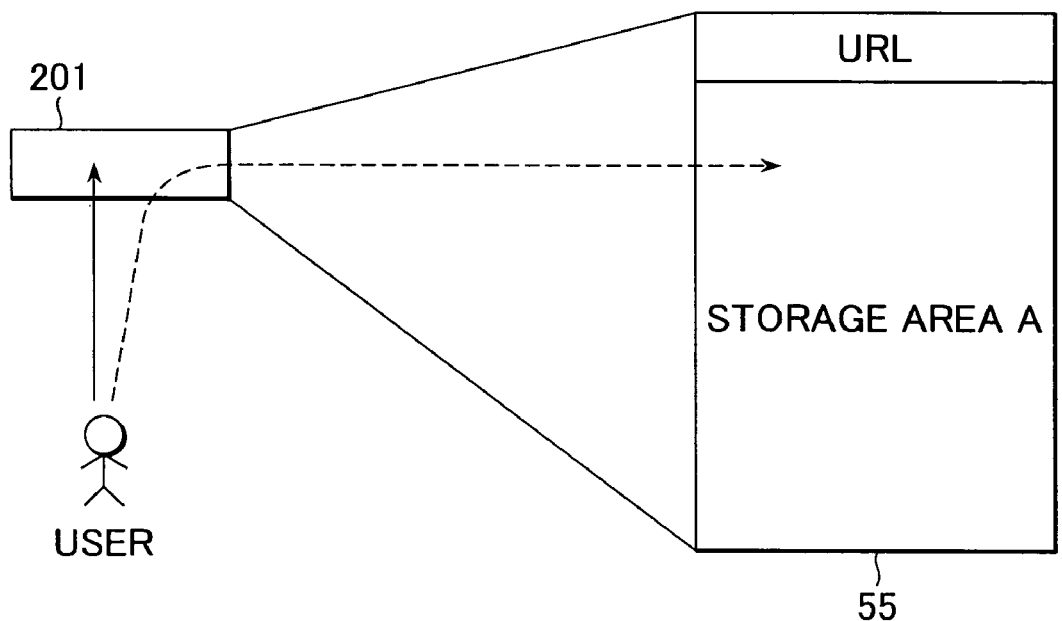
FIG. 11 is a view illustrating the relationship between a recording medium and a storage area.

A description is now given of the processing employing the recording medium 201 recorded with this kind of information. First, a description is given with reference to FIG. 11 of how the recording medium 201 is used on the user side. FIG. 11 is a conceptual view for illustrating the relationship between the recording medium 201 and the prescribed storage area (in the following, simply referred to as a storage area A) of the storage section 55 of the management server 2 indicated by the URL stored in the recording medium 201. The recording medium 201 is a recording medium with a fixed capacity of, for example, one megabyte, etc. that can be easily inserted into and removed from a apparatus such as the PC 4 by the user.

With respect to this, the storage area A is provided on the side of the management server 2 and has a variable storage capacity (as described above, the capacity is secured by the processing of step S42, and this capacity can be preset in advance, with it being possible to change this setting on the user side or the service providing side). The capacity of the storage area A is preferably larger than the capacity of the recording medium 201, and the description of this embodiment continues as this capacity of the storage area A is large. Further, it is basically not necessary for the storage area A to be freely detachable and the storage area is preferably fixed rather than freely detachable.

The case of accessing the recording medium 201 by the user is shown by the solid line in FIG. 11, but actually the user accesses the storage area A as shown by the dotted line in FIG. 11. For example, when the recording medium 201 is installed in the D drive of the PC 4, even if the user wishes to access the D drive, in reality, it is the storage area A that is accessed.

For example, in the event that the user executes the processing to store the prescribed file A in the recording medium 201, in reality, the file A is stored in the storage area A. Further, in the event that processing is executed in order to observe the file A that the user intends is recorded on the recording medium 201, in reality, because the file A is recorded in the storage area A rather than in the recording medium 201, the storage area A is accessed and the file A is read-out from the storage area A.

The actual state of the recording medium 201 is the storage area A. As a result, in the event that the recording medium 201 has a capacity of one megabyte and the storage area A has a capacity of 100 megabytes, it is possible for a 100-megabyte storage area A to be used without the user being aware of this regardless of the user using a recording medium 201 of one megabyte.

The recording medium 201 is not limited and may be any type of medium. Even, for example, if the recording medium is, for example, a flexible disc that only has a capacity in the order of one megabyte, even if this kind of relatively low capacity recording medium 201 is used, if the present invention is applied, the user will get the same or greater results as if a large capacity recording medium is used.

Further, the recording medium 201 may also be a medium such as a CD-R (Compact Disk Recordable) where data cannot be deleted if written once, or may be a medium for which write-once is not possible (or difficult). Even if this kind of recording medium is used as the recording medium 201, the storage area A is capable of having data deleted and added. If the present invention is therefore applied, as a result, whatever kind of recording medium 201 the user employs, it is still possible to execute the desired processing such as deletion and addition of data.

The recording medium 201 is a recording medium that a user is able to carry around with them (or can be made to be this type of recording medium). The user can, therefore, use the storage area (access the storage area A) from any kind of location. It is, therefore, possible as a result for a user to handle a large storage capacity recording medium simply by having the small capacity recording medium 201 (which can also be made to have a small sized). It is also possible to improve the level of convenience for the user.

The results described above are brought about by using the recording medium 201 and the storage area A, but a description is now given with reference to the flowchart of FIG. 12 of the processing carried out at the PC 4 in order to obtain these results. The description continues on from installing the recording medium 201 in the PC 4 (FIG. 1).

In step S61, the PC 4 determines whether or not there has been a request to make a connection with the management server 2 from the user. This determination is carried out by, for example, determining whether or not a prescribed operation requesting a connection (for example, operation of a prescribed button) is carried out by the control section 184 (FIG. 7). In step S61, a waiting condition is maintained until there is an instruction from a user. When there is an instruction from a user, the processing proceeds to step S62. In step S62, it is determined whether or not the recording medium 201 is installed in the drive 160 (FIG. 6).

In step S62, in the event that it is determined that the recording medium 201 is not installed in the drive 160, the processing returns to step S61. During this time, it is preferable to display a message that makes the user aware that the recording medium 201 is not installed in the drive 160.

It is also possible for the processing of step S61 and step S62 to be omitted. Here, a description is given where no connection is made with the management server 2 if there is no instruction from the user. However, it is also possible to perform setting in such a manner that a connection is made with the management server 2 regardless of an instruction from the user when, for example, the recording medium 201 is installed in the drive 160. In this case, the making of a connection with the management server 2 is commenced at the time the recording medium 201 is installed in the drive 160 regardless of whether or not there is an instruction from the user.

In step S63, in the event that it is determined that the recording medium 201 is installed in the drive 160, the processing proceeds to step S63. In step S63, the connection information (in this case, a URL) is read from the installed recording medium 201. This reading is performed by the read-out section 186 (FIG. 7).

In step S64, the connection to the read-out URL is started. This URL is for accessing the prescribed storage area of the management server 2. In step S65, it is determined whether or not the prescribed recording region A of the management server 2 can be properly accessed (whether or not a connection can be established).

In step S65, if it is determined for whatever reason that a connection cannot be made so that step S65 ends in failure, the processing of step S61 is returned to. During this time, it is also preferable to display a message to make the user aware that the connection ends in failure.

In step S65, in the event that it is determined that an access to the prescribed storage area A of the management server 2 is carried out, the processing proceeds to step S66.

Because the URL (connection information) for accessing the prescribed recording region of the management server 2 is recorded on the recording medium 201 itself, it is possible for the prescribed region of the management server 2 to be accessed simply by installing the recording medium 201 in the drive 160. It is, therefore, possible for a user to access the management server 2 in an extremely convenient manner because it is not necessary for the user to remember a URL or a password to make an access, and there is no complicated processing involved in making the access.

The path conversion is performed in step S66. As described with reference to FIG. 11, although the user perceives that it is the recording medium 201 that is being accessed, in reality, what is actually being accessed (even if processing to access the recording medium 201 is executed) is the storage area A provided at the storage unit 55 on the side of the management server 2. At the PC 4, it is necessary for processing to be carried out to give the user the perception that it is the recording medium 201 that is being accessed while processing is actually executed to access the storage area A.

For example, in the event that the recording medium 201 is installed in the D drive, the user executes an operation to access the D drive. On the side of the PC 4, when there is an access to the D drive, it is necessary to carry out the processing to convert the destination of the access to the storage area A. To this end, in step S66, the processing is executed to convert the path, i.e. the path to the recording medium 201 instructed by the user, to the path to the storage area A.

The conversion of the path carried out in step S66 is described with reference to FIG. 13. The data in the state before the path conversion is shown in the upper half of FIG. 13, and the data in the state after the path conversion is shown in the lower half of FIG. 13. Here, "file1.jpg" is described in the first line of the data shown in the upper half of FIG. 13, with this description meaning that the user wishes to refer to "file1.jpg" perceived as being stored in the recording medium 201.

However, "file1.jpg" is not actually recorded on the recording medium 201, but rather is stored in the storage area A. Further, the URL designating this storage area A is recorded on the recording medium 201. This URL is taken to be "transpace/dir012345".

Taking note of the first line of the data shown in the lower half of FIG. 13, this is then converted to "transpace/dir012345/file1.jpg". Namely, the path is converted to a path referencing to "file1.jpg" stored in "transpace/dir012345". In other words, the path is converted to a path referencing "file1" stored in the storage area A.

In this way, a new path is generated by adding the URL read from the storage area A before the path designated by the user. This processing is carried out as the processing of step S66. The processing relating to the path conversion may be carried out by the connection control section 185 (FIG. 7) or by the control section 184.

The user instructs the reading and writing of the data to and from the recording medium 201, but in reality these instructions are outputted to the storage area A. In the description below, the processing carried out with respect to the recording medium 201 from the standpoint of the user is taken to be processing carried out at the storage area A from the standpoint of the PC 4, and this meaning is taken to be implied even if not stated.

The execution of the processing in step S66 is carried out in the event that the user instructs for some kind of the processing to be carried out on the data recorded in the recording medium 201 (storage area A). In step S67, a determination is made as to whether or not this instruction is to write data. When it is determined that the writing of data is instructed in step S67, the processing advances to step S68.

In step S68, the data instructed to be written to the recording medium 201 is read-out. The data instructed for writing may be, for example, the data stored in the storage unit 187 (FIG. 7). The data read-out as the target of writing is then supplied to the encryption section 182 (FIG. 7). The keys (FIG. 10) read out from the recording medium 201 by the read-out section 186 are also supplied to the encryption section 182. The encryption section 182 then encrypts the provided data using the same provided keys. The encrypted data (encrypted text) is then provided to the communication control section 181 and sent to the storage area A of the management server 2 under the control of the communication control section 181. As a result, the data is written to the storage area A on the side of the management server 2.

Thus, the data writing is carried out. When this processing is completed, the processing of step S66 onwards is repeated for the next instruction. The details of the processing on the side of the management server 2 are described with reference to the flowchart of FIG. 13. Here, the management server 2 stores the encrypted data sent from the PC 4 side as is in the storage area A. As a result, even if the data stored in the storage area A is misappropriated by a third party for whatever reason, because this data is encrypted, the third party will not be able to use the misappropriated data, which prevents the misuse by the third party.

On the other hand, when it is determined in step S67 that the instruction from the user is not an instruction to write data, the processing of step S69 is proceeded to. In step S69, a determination is made as to whether or not the instruction from the user is an instruction to read data recorded on the recording medium 201. When it is determined in step S69 that the instruction from the user is an instruction to read data, the processing proceeds to step S70.

In the event that the reading of the data is instructed, the instructed data is read-out at the side of the management server 2 from the connected storage area A and the read-out data is transmitted from the side of the management server 2. The data that is transmitted, i.e. the data instructed to be read out, is received in the processing of step S70.

This transmitted data is data that is encrypted using the keys stored in the recording medium 201, i.e. in other words, encrypted using the keys managed on the user side.

Thus encrypted data received by the communication control unit 181 (FIG. 7) of the PC 4 is supplied to the decryption section 183. The keys are also supplied to the decryption section 183 from the read-out section 186. The decryption section 183 then decrypts the encrypted data using the keys provided. The decrypted data is then stored in the storage section 187, and processing such as the display of images on a display (not shown) based on this data is executed based on the user instructions.

Thus, reading of the data is carried out. When this processing is completed, the processing of step S66 onwards is repeated for the next instruction.

As described above, while the transfer of the data takes place between the PC 4 and the management server 2, the data is encrypted. Further, the keys used in this encryption are only recorded on the recording medium 201. Namely, keys are managed on the user-side, and are not managed on the side of the management server 2. This brings about the following results.

First, because the data transferred via the network 1 (FIG. 1) is encrypted, even if this data is misappropriated by a third party over the network 1, this data cannot be effectively utilized by the third party. Further, even if the data is misappropriated as a result of the transfer process, it is possible for misuse to be prevented to as an great extent as possible. As the keys used in the encryption are recorded in the recording medium 201, basically, the keys can be made as long as desired, provided that this is within the storage capacity of the storage area 201. It can, therefore, be considered that the possibility of the data encrypted using this kind of a long key by the third party that is not aware of the key is approaching zero.

The keys described above are only managed on the user-side. It is, therefore, possible for what kind of key is used on the user side, i.e. what kind of encryption method is used to be decided on the user-side. It is also possible for the likelihood of misuse in the event of the misappropriation of the encrypted data to further approach zero if an encryption method unique to the user is employed.

Further, the misappropriation of the keys from the management server 2 is prevented because the keys are not managed on the side of the management server, i.e. the keys are not managed (not stored) on the side of the management server 2 which can be accessed by a plurality of users, and it is, therefore, possible to further improve the security. Moreover, if the keys are not managed on the side of the management server 2, it is not necessary to secure the storage capacity within the storage section 55 in order to manage the keys, and the amount of capacity for the storage area A allotted to a user can therefore be made large.

In the embodiment described above, the keys themselves are not transferred via the network 1. This makes it possible to prevent the keys from becoming misappropriated during the communication via the network 1 so that the security of the overall system can also be increased.

Returning to the description of the flowchart of FIG. 12, in step S69, in the event that it is determined that an instruction from the user is not to read data, the processing proceeds to step S71. Advancing of the processing to step S71 takes place because there are times when it is desirable to, for example, display a list of file names, so that the user can recognize what kind of data is stored in the data (directory) stored in the recording medium 201 (the storage area A).

In the event that this kind of instruction is outputted, the control unit 184 (FIG. 7) of the PC 4 controls the communication control section 181 so as to send the data designating the list of file names to the management server 2. As a result of this transmission, the data required for the list of file names is received from the management server 2 and display operation is carried out based on this data.

While this display is being carried out, the PC 4 does not use the data sent from the management server 2 as is, but rather uses this data after converting a part of this data. The reason for this is the same as the reason described for the processing of step S66, i.e. that the storage of the data takes place at the storage area A, but the user handles the data as if the data is recorded on the recording medium 201. It is then necessary to execute the processing such as the path conversion, etc. on the side of the PC 4 because of this way of handling.

A description is now given with reference to FIG. 14 of the path conversion carried out by the PC 4. The upper part of FIG. 14 shows the data sent from the management server 2 that is the data that is not yet to be subjected to the path conversion, while the lower part of FIG. 14 shows the data that is subjected to the path conversion by the PC 4. Here, "transpace/dir012345/file1.jpg" is described on the fourth line of the data shown in the upper part of FIG. 14, with this description being the path to the storage area A as managed on the side of the management server 2.

This path is then converted to "file1.jpg" at the fourth line of the data as shown in the lower part of FIG. 14. This description is the path at the recording medium 201. The path is therefore converted in this manner. The processing occurring in step S71 is then executed using the data shown in the lower part of FIG. 14 that is subjected to the path conversion.

In this way, a summary of the data stored in the storage area A is displayed. When this processing is completed, the processing of step S66 onwards is repeated for the next instruction.

This processing is carried out on the side of the PC 4 in which the recording medium 201 is installed. The processing corresponding to this processing executed on the side of the management server 2 is now described with reference to the flowchart of FIG. 15.

In step S91, the communication control section 51 (FIG. 3) of the management server 2 receives the data from the PC 4. This received data is then provided to the determination section 52. In step S92, the determination section 52 assesses the request exhibited by the provided data. Basically, a request from the PC 4 may be a request to write data, a request to read data, or a request to provide a data summary. In step S93, the determination section 52 determines whether or not the determination results are to request the writing of data.

When it is determined in step S93 that the request is a request to write data, the processing proceeds to step S94. In step S94, the storage control section 54 extracts the data (while destroying headers etc.), of the data received by the communication control section 51, that is stored in the storage section 55 for storage in the storage area A of the storage unit 55. This stored data is the data that is encrypted using the keys stored in the recording medium 201.

Thus, data writing is carried out. When this processing is completed, the processing of step S91 onwards is repeated for the next instruction.

On the other hand, in the event that it is determined in step S93 that the request is not a request to write data, the processing proceeds to step S95, and a determination is made as to whether or not the request is a request to read data. When it is determined in step S95 that the request is a request to read data, the processing proceeds to step S96. In step S96, the designated data is read from the storage section 55 by the storage control section 54. Data referred to while reading out this data is data for which the path is converted on the PC 4 as described above, and includes the data directly indicating the prescribed region of the storage area A of the storage section 55.

This data read-out from the storage unit 55 by the storage control section 54 is the data encrypted using the keys recorded in the recording medium 201. Data read-out from the storage section 55 is then transmitted to the PC 4 by the communication control section 51.

This enables reading of the data to be carried out. When this processing is completed, the processing of step S91 onwards is repeated for the next instruction.

On the other hand, when it is determined in step S95 that the request is not a request to read the data, the processing proceeds to step S97. The advancing of the processing to step S97 means that the request is a request to provide a summary of the data stored in the storage area A. Therefore, in step S97, the storage area A of the storage section 55 is referred to by the storage control section 54, and data for displaying the file name, etc. in a list is created. The data created in this manner is then transmitted by the communication control section 51.

This enables the data for a summary of the data to be transmitted. When this processing is completed, the processing of step S91 onwards is repeated for the next instruction.

Encryption and decryption is not carried out on the side of the management server 2 during the reading and writing of data. Time is therefore not required for the encryption and the decryption, and responses can be made to user requests very rapidly.

In the above embodiments, the keys used upon encryption and decryption are stored in the recording medium 201. This leaves open the possibility of the keys being misappropriated from the recording medium 201 itself and countermeasures to avoid this will now be described. It is possible to consider the use of existing technology to ensure that keys recorded on the recording medium 201 are not illegally copied, etc. For example, the technology used in protecting the copyrights may be given as an existing technology.

Basically, a technology for protecting copyrights does not allow any copy or only permits copy of a limited number of times. If the protection is therefore applied to ensure that keys recorded on the recording medium 201 cannot be copied, it is possible to prevent the fraudulent copying of the keys. This makes it possible to further increase the security.

In the embodiments described above, as shown in FIG. 10, a description is given where URLs and keys, etc. are recorded on the recording medium 201, but as the recording medium 201 is a recording medium, other types of data such as, for example, partial data, may also be stored in the storage area A. In this case, for example, in the event that reading of the prescribed data is instructed, whether or not the data is recorded on the recording medium is determined, with the storage area then being accessed only when it is determined that data is not recorded.

The recording medium 201 may also be used as cache.

The series of processes described above are able to be executed using a hardware having the respective functions, but may also be executed by software. When the series of processes is implemented using software, the programs comprising this software may be built-into the dedicated hardware of a computer. Further, as it is possible to implement the various functions by installing the various programs, such installation is also possible from a recording medium to, for example, a general-purpose personal computer.

In addition to packaged media that are separate from a personal computer taken as the registration device 3 such as the magnetic disc 101 (including flexible discs), the optical disc 102 (including CD-ROMs (Compact Disc-Read Only Memory) and DVDs (Digital Versatile Discs)), magneto-optical discs 103 (including MDs (Mini-Discs which is the Registered Trademark), and semiconductor memory 104, etc. recorded with programs for distribution to provide programs to the user, the recording medium may also be provided to the user through pre-installation on a computer or in the form of a hard disc, etc. containing the ROM 82, or the storage section 88 in which the program is stored.

In this specification, the steps described by programs provided from the recording media are for processing carried out in chronological order in the order disclosed, but this processing by no means has to be carried out in chronological order, and these processes may also be executed in parallel or individually.

Further, in this specification, a term "system" refers to the overall apparatus configured with a plurality of apparatuses.

What is claimed is:

1. An information processing system configured with first, second, and third information processing apparatuses, each connected to a prescribed network, wherein
the first information processing apparatus comprises:
storage means for storing data;
securing means for securing a storage area of a prescribed capacity in the storage means according to a request from the second information processing apparatus; and
providing means for providing connection information for connecting the storage area secured by the securing means to the second information processing apparatus;
the second information processing apparatus comprises:
requesting means for making a request to the first information processing apparatus to secure a storage area;
receiving means for receiving the connection information supplied by the providing means;
generating means for generating keys used in encryption; and
recording means for recording the connection information received by the receiving means and the keys generated by the generating means in a prescribed recording medium; and
the third information processing apparatus comprises:

connection means for reading the connection information from the recording medium when the recording medium, recorded with the connection information and keys by the recording means, is installed, and connecting to the storage area; and encryption means for reading the keys from the recording medium when the data is transmitted at a time after completion of connection with the storage area by the connection means, and encrypting the transmitted data.

2. An information processing apparatus for managing data supplied from another information processing apparatus, comprising:

storage means for storing data;

receiving means for receiving a request from another information processing apparatus;

determination means for determining whether provision of connection information is necessary based on the request;

securing means for securing a storage area of a prescribed capacity in the storage means according to a request from another information processing apparatus;

providing means for providing connection information for connecting the storage area secured by the securing means to said another information processing apparatus; and control means for reading out the data stored in the storage area according to a request of said another information processing apparatus and for controlling writing of the data to the storage area, wherein the data stored in the storage area is data encrypted using keys generated and managed by said another information processing apparatus.

3. An information processing method of an information processing apparatus for managing data supplied from another information processing apparatus, comprising:

receiving a request from another information processing apparatus;

determining whether provision of connection information is necessary based on the request;

a securing step for securing a storage area of a prescribed capacity in a storage device according to a request from another information processing apparatus;

a providing step for providing connection information for connecting the storage area secured as a result of processing in the securing step to said another information processing apparatus; and a control step for reading out the data stored in the storage area according to a request of said another information processing apparatus and controlling writing of data to the storage area, wherein the data stored in the storage area is data encrypted using keys generated and managed by said another information processing apparatus.

4. A recording medium on which a computer program for controlling an information processing apparatus for managing data supplied from another information processing apparatus is recorded to be readable by a computer, said computer program comprising:

a receiving step for receiving a request from another information processing apparatus;

a determination step for determining whether provision of connection information is necessary based on the request;

a securing step for securing a storage area of a prescribed capacity in a storage device according to a request from another information processing apparatus, a providing step for providing connection information for connecting the storage area secured as a result of processing in the securing step to said another information processing apparatus; and a control step for reading out data stored in the storage area according to a request of said another information processing apparatus, and controlling writing of the data to the storage area, wherein the data stored in the storage area is data encrypted using keys generated and managed by said another information processing apparatus.

5. An information processing apparatus comprising:

read-out means for reading out connection information stored in an electronic device when the electronic device, having correlating information of processing terminals to be connected, is installed;

connection control means for connecting with another information processing terminal based on the connection information read-out by the read-out means;

encryption means for reading out keys from an other electronic device and encrypting data when the data is sent to said other information processing terminals;

decrypting means for reading out the keys from the electronic device and decrypting the data when the data is received from another information processing terminal; and conversion means for converting a path indicating a transmission destination from the path for the electronic device to a path for another information processing terminal when the data encrypted by the encryption means is transmitted, and converting a path indicating a location where the data is stored from a the path for the electronic device to the path for another information processing terminal when a request is made for the data decrypted by the decrypting means to another information processing terminal;

wherein at least one of the read-out means, connection control means, encryption means, decrypting means, and conversion means is implemented in hardware.

6. An information processing method for an information processing apparatus equipped with read-out means for reading out information from an installed electronic device and communication means for performing transmission and/or reception of data to and from other information processing apparatus, comprising:

a read-out step of reading out connection information stored in the electronic device when the electronic device, having correlating information of processing apparatuses to be connected, is installed;

a connection control step of controlling connection with another information processing apparatus based on the connection information read out as a result of processing of the read-out step;

an encryption step of reading out keys from other electronic device and encrypting data when the data is sent to another information processing apparatus;

a decrypting step of reading out the keys from the electronic device and decrypting data when the data is received from said another information processing apparatus; and a conversion step of converting a path indicating a transmission destination from the path for the electronic device to a path for another information processing terminal when the data encrypted by the encryption means is transmitted, and converting a path indicating a location where the data is stored from a the path for the electronic device to the path for another information processing terminal when a request is made for the data decrypted by the decrypting means to another information processing terminal.

7. A non-transitory computer-readable medium storing a computer-readable program for controlling an information processing apparatus equipped with read-out means for reading out information from an installed electronic device and for controlling communication means performing transmission and or reception of data to and from other information processing apparatuses, the program comprising:
- a read-out step of reading out connection information stored in the electronic device when the electronic device, having correlating information of processing apparatuses to be connected, is installed;
- a connection control step of controlling connection with another information processing apparatus based on the connection information read out as a result of processing of the read-out step;
- an encryption step of reading out keys from an other electronic device and encrypting data when the data is sent to other information processing apparatuses;
- a decrypting step of reading out the keys from the electronic device and decrypting the data when the data is received from said another information processing apparatus; and
- a conversion step of converting a path indicating a transmission destination from the path for the electronic device to a path for another information processing terminal when the data encrypted by the encryption means is transmitted, and converting a path indicating a location where the data is stored from a the path for the electronic device to the path for another information processing terminal when a request is made for the data decrypted by the decrypting means to another information processing terminal.

8. A non-transitory computer-readable medium storing a computer-readable program for controlling an information processing apparatus equipped with read-out means for reading out information from an installed electronic device and communication means for performing transmission and or reception of data to and from other information processing apparatuses, the program comprising:
- a read-out step of reading out connection information stored in the electronic device when the electronic device, having correlating information of processing apparatuses to be connected is installed;
- a connection control step of controlling connection with another information processing apparatus based on the connection information read out as a result of processing of the read-out step;
- an encryption step for reading out keys from an other electronic device and encrypting data when the data is sent to other information processing apparatuses;
- a decrypting step for reading out the keys from the electronic device and decrypting the data when the data is received from said another information processing apparatus; and
- a conversion step of converting a path indicating a transmission destination from the path for the electronic device to a path for another information processing terminal when the data encrypted by the encryption means is transmitted, and converting a path indicating a location where the data is stored from a the path for the electronic device to the path for another information processing terminal when a request is made for the data decrypted by the decrypting means to another information processing terminal.

* * * * *